United States Patent [19]
Jackman et al.

[11] Patent Number: 6,154,124
[45] Date of Patent: Nov. 28, 2000

[54] WINDSHIELD WIPER ALARM

[76] Inventors: William Jackman, P.O. Box 7482, Spokane, Wash. 99207; Richard Hall, 7059 White Oak Ave., Reseda, Calif. 91335

[21] Appl. No.: 09/122,476

[22] Filed: Jul. 23, 1998

[51] Int. Cl.[7] .................................................. B60Q 1/00
[52] U.S. Cl. ................................. 340/438; 318/DIG. 2; 340/425.5; 340/457; 340/459
[58] Field of Search ................... 340/425.5, 438, 340/439, 450.3, 451, 457, 459, 601, 602; 318/483, 444, DIG. 2, 471, 476

[56] References Cited

U.S. PATENT DOCUMENTS

| | | |
|---|---|---|
| 1,299,979 | 4/1919 | Malburg . |
| 2,387,953 | 10/1945 | Terry ........................................ 177/329 |
| 3,085,429 | 4/1963 | Majendie ................................... 73/178 |
| 3,529,283 | 9/1970 | Emerson et al. . |
| 3,641,488 | 2/1972 | Mullin . |
| 4,097,839 | 6/1978 | Lesiak ..................................... 340/457 |
| 4,575,706 | 3/1986 | Heidman, Jr. .......................... 340/426 |
| 4,797,671 | 1/1989 | Toal, Jr. ............................. 340/825.49 |
| 4,887,068 | 12/1989 | Umehara .............................. 340/450.3 |
| 5,313,072 | 5/1994 | Vachss ................................... 340/602 |
| 5,581,240 | 12/1996 | Egger ..................................... 340/602 |

Primary Examiner—Brent A. Swarthout
Attorney, Agent, or Firm—Wells, St. John, Roberts, Gregory & Matkin, P.S.

[57] ABSTRACT

In accordance with one aspect of the invention, a driver alert system includes a sensor, a windshield wiper of a vehicle, and circuitry. The sensor detects a predetermined condition on the vehicle. The circuitry is configured to activate the windshield wiper when the predetermined condition is detected. Additionally, a method is disclosed according to such system.

29 Claims, 5 Drawing Sheets

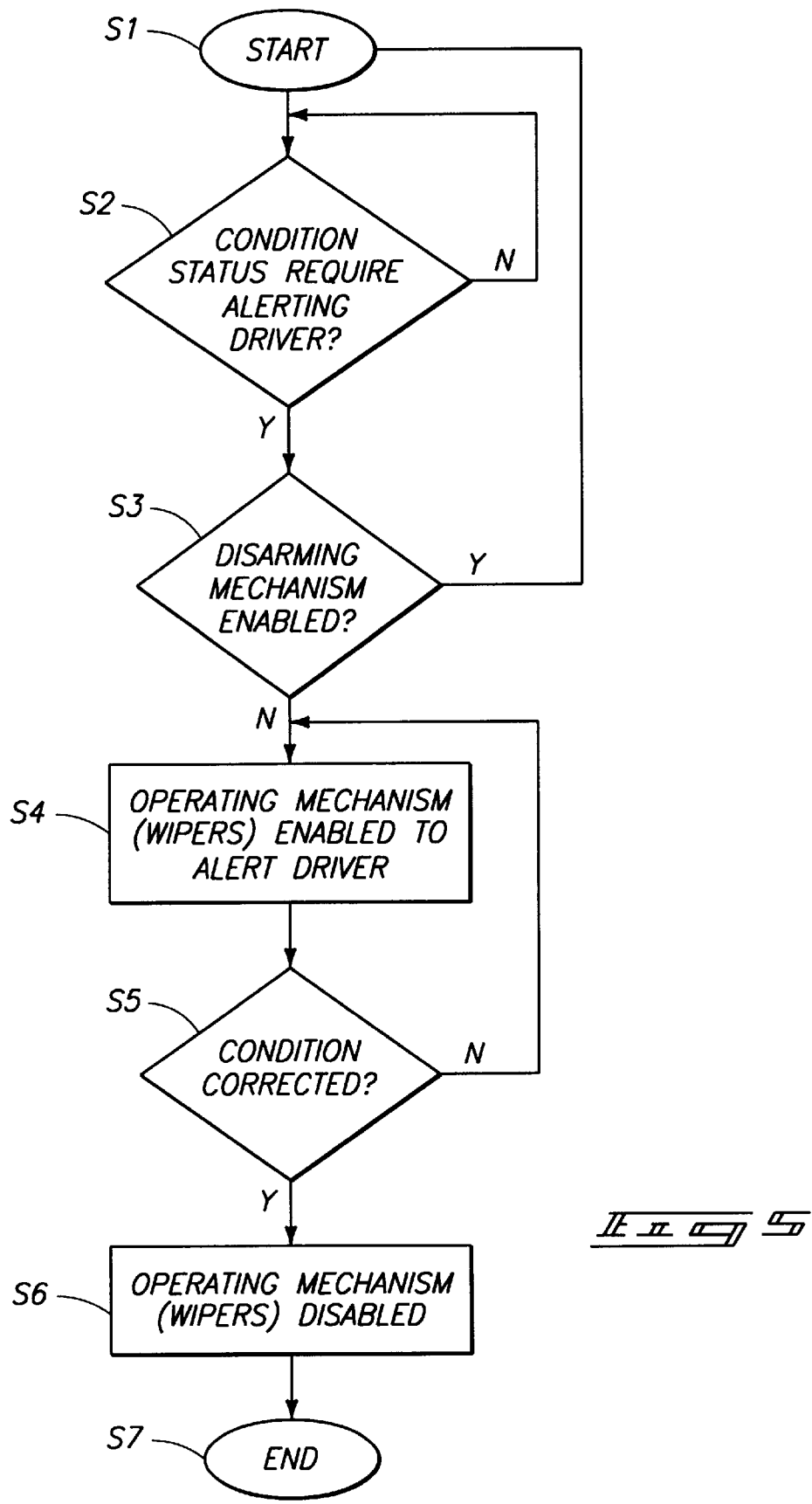

WINDSHIELD WIPER ALARM

TECHNICAL FIELD

This invention pertains to a driver alert system for vehicles. More particularly, this invention pertains to a system and method for engaging or activating the windshield wipers of a vehicle such as a car, truck or plane when one or more predetermined conditions exist, to alert the driver or pilot to the conditions.

BACKGROUND OF THE INVENTION

There have been numerous systems developed which are directed to alerting the driver of a vehicle that certain conditions exist, examples of which are a warning light on a vehicle's dash or instrument panel, the activation of an audible noise such as a siren or alarm, and the blinking of lights. However, these driver alert systems require unnecessary additional equipment to be added to the vehicle. Furthermore, these driver alert systems do not provide an effective alert system for drivers of emergency vehicles for instance, where sirens and/or lights may already be flashing, which causes background noise that conceals operation of the alert system. In such situations, the alert system may likely go unnoticed by the driver and the condition would persist, perhaps leading to accident or injury.

It is therefore an object of this invention to provide a driver alert system for alerting the driver of a vehicle that a predetermined condition or conditions exist, which would be perceivable to the driver notwithstanding the environment the vehicle is in.

This invention accomplishes such objective by activating the windshield wipers of the vehicle at a high rate of speed when certain predetermined conditions exist. Additionally, or alternatively, other operating mechanisms that already exist on a vehicle can also be activated to alert a vehicle occupant to the presence of such predetermined condition. For example, an audible alarm and/or a flashing light can also be activated in order to alert an operator of a vehicle. In the emergency response industry, when time is of the essence in responding to a call, it is important that several conditions are not present when driving the vehicle out of the fire station or garage for instance. It is not uncommon for fire trucks, as further example, to attempt to leave the fire station before all the doors on the vehicle are closed and secured, thereby causing the open door to hit a structure or another vehicle or person. Likewise, there exist other predetermined conditions that require monitoring and alerting of an occupant when detected in an undesirable state such as hood/lid closure, fluid levels, tire air pressure, coolant temperature and levels, and operation of emergency warning devices.

Additional objects, features and advantages of this invention are to provide an apparatus and method for alerting a vehicle occupant such as a driver, operator, passenger and/or pilot of the existence of detected predetermined conditions requiring remediation. Such objects, features and advantages are implemented on a vehicle, preferably using existing standard mechanical accessories that are already provided on the vehicle, such that a signaling indicia of the accessory is operative as an alerting signal to warn a driver, operator, passenger, pilot and/or user of such a condition in a manner that is extremely accurate, simple, economical and utilizes conventional mechanical accessories on the vehicle. Accordingly, implementation of such invention provides an apparatus which readily, easily and reliably alerts an operator of such detected predetermined condition(s) in a manner that is rugged, durable, of economical manufacture and assembly, adds safety, and requires little service and maintenance.

BRIEF DESCRIPTION OF THE DRAWINGS

Preferred embodiments of the invention are described below with reference to the following accompanying drawings.

FIG. 5 comprises a flow chart illustrating the sequence of steps employed on an integrated circuit in alerting a vehicle occupant when a predetermined condition exists.

DETAILED DESCRIPTION OF THE PREFERRED EMBODIMENTS

Figure 1:
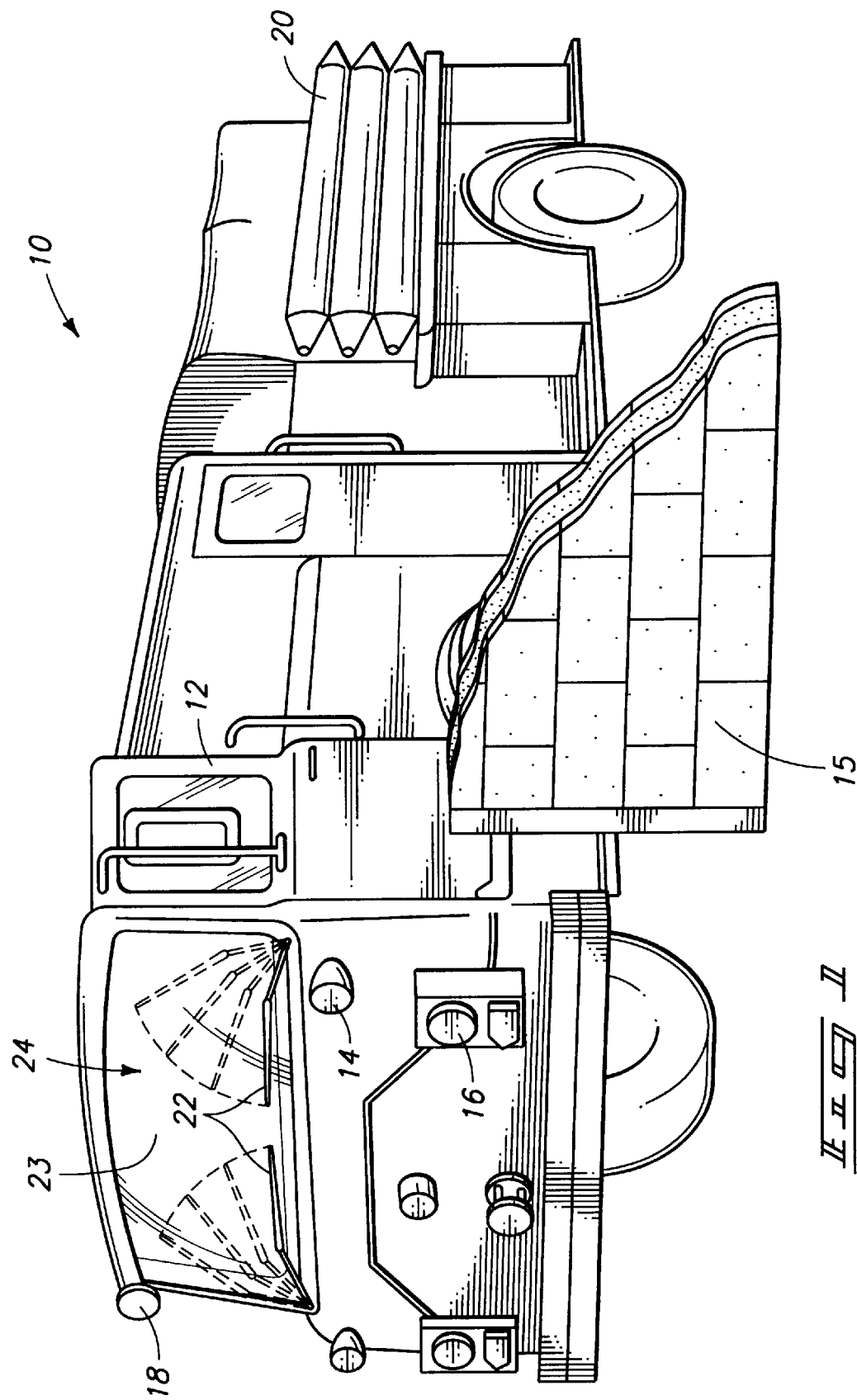
FIG. 1 is a perspective view of a fire truck with doors open and a cut-away view of part of a garage structure which the doors will hit if not closed and illustrating the windshield wipers moving at a high rate of speed, alerting the driver.

This disclosure of the invention is submitted in furtherance of the constitutional purposes of the U.S. Patent Laws "to promote the progress of science and useful arts" (Article 1, Section 8).

In accordance with one aspect of the invention, a driver alert system includes a sensor, a windshield wiper of a vehicle, and circuitry. The sensor detects a predetermined condition on the vehicle. The circuitry is configured to activate the windshield wiper when the predetermined condition is detected.

In accordance with another aspect of the invention, a method for alerting a driver to a predetermined condition comprises placing a sensor on a vehicle, the sensor outputting a sensor signal as a function of a predetermined condition of the vehicle. The method also includes detecting the sensor signal and determining the existence of the predetermined condition based upon the detected sensor signal. Furthermore, the method includes starting a windshield wiper at an identifiable operating speed to alert a vehicle occupant when the predetermined condition is detected.

A preferred embodiment driver alert system in accordance with the invention is first described with reference to FIGS. 1 and 3–5. Such show various aspects and characteristics described further below with respect to an emergency vehicle 10 having a driver alert system designated generally in FIGS. 1 and 3–5 as reference numeral 24. An alternative preferred embodiment is disclosed with reference to FIGS. 2–5 in the form of an automobile 110 having a driver alert system 124 of this invention substantially identical to alert system 24 (of FIG. 1).

As shown in FIG. 1, one vehicle configured with the apparatus and method of this invention comprises an emergency vehicle 10 having several predetermined conditions that can exist on the vehicle, with one or more requiring that a driver be alerted to the detection of such predetermined conditions. For example, emergency vehicle 10 is depicted as a medium-duty emergency and rescue vehicle such as a fire truck. Alternatively, such vehicle 10 can comprise an ambulance, an emergency medical service (EMS) vehicle, a tow truck, or any other emergency service type vehicle. As shown in FIG. 1, vehicle 10 includes at least one door 12 usable by an operator or passenger for entry and exit. For the case where vehicle 10 comprises a fire truck, a driver and passenger(s) each enter through one of several such doors 12, typically in a hurried manner in order to expedite transport to a remote site containing an emergency situation such as a building fire.

Typically, an emergency vehicle 10 such as a fire truck is rapidly dispatched on calls, requiring that the occupants board the vehicle in a hurried manner. Hence, it is highly likely that door 12 will not be shut as the vehicle is driven through a garage door and out onto a street. Accordingly, door 12 could strike a garage door frame 15, causing damage to the door frame and/or an occupant or bystander. Therefore, there is a need to alert occupants, including the driver, when the door has not been safely and completely closed shut.

It is to be understood that other predetermined conditions might exist on emergency vehicle 10, requiring that they be detected and that an occupant be notified prior to vehicle 10 leaving a firehouse. For example, several predetermined conditions requiring detection include detection of the proper operation of emergency lights 14, running lights 16, and/or siren 18. Additionally, contact sensors (not shown) can be strategically placed on the vehicle to detect the presence of equipment 20 that must be carried on vehicle 10 when performing an emergency call. In one case, equipment 20 comprises a ladder. In other cases, equipment 20 comprises fire-fighting equipment such as hoses, adapters, nozzles, axes and other such equipment.

Desirably, an operating mechanism comprising an existing standard mechanical accessory is used to notify or alert a vehicle occupant when a predetermined condition exists. Such operating mechanism has an alarm-indicating activated state. A standard mechanical accessory is understood to comprise an already existing component or accessory provided on a vehicle. Optionally, a dedicated standard mechanical accessory can be provided on a vehicle.

One existing standard mechanical accessory provided on emergency vehicle 10 comprises a pair of wipers 22 that are oscillated along window 23 to remove moisture therefrom. Optionally, another existing standard mechanical accessory on vehicle 10 comprises siren 18. Accordingly, wipers 22 form part of a driver alert system 24 of this invention in that they are activated to run in a user-identifiable operating mode that is capable of being identified by a vehicle occupant as a warning signal. One such user-identifiable operating mode comprises running the wiper at a special, high-operating speed which a user can distinguish from a normal operating mode. Another such user-identifiable operating mode comprises operating the wipers at one of several already-existing operating speeds. For example, such wipers can be operated at their highest standard operating speed. Such warning signal alerts an occupant that an undesirable predetermined condition exists on vehicle 10.

Figure 2:
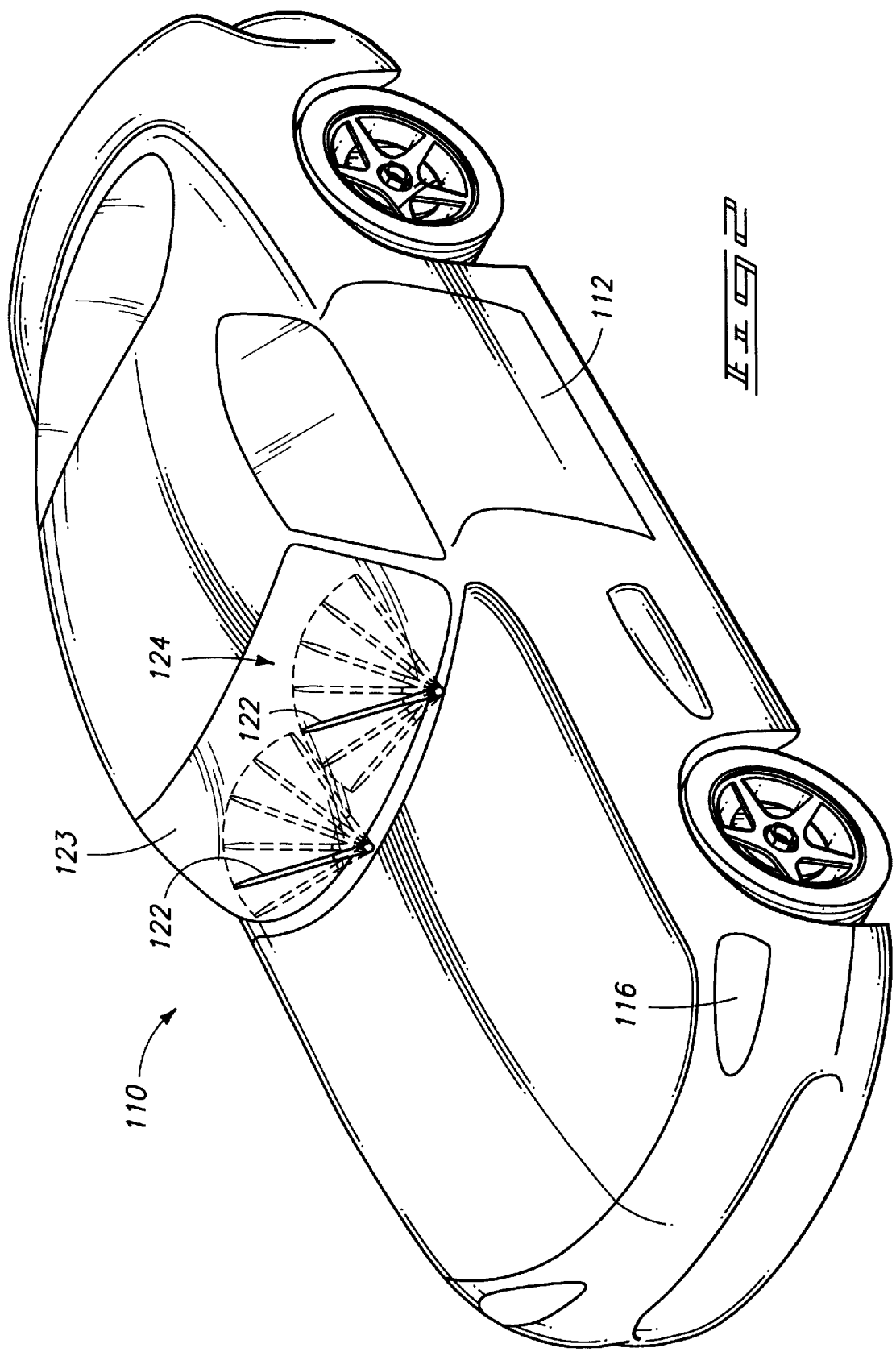
FIG. 2 is a perspective view of an automobile, illustrating the windshield wipers moving at a high rate of speed, alerting the driver that one of a number of predetermined conditions exist.

FIG. 2 illustrates an alternative preferred embodiment 110. Driver alert system 124 is configured so as to be substantially similar to driver alert system 24 of FIG. 1, as described below in further detail with reference to FIGS. 3–5. For the case of vehicle 110, the predetermined condition comprises detection of whether door 112 on vehicle 110 is open or ajar. An additional and/or optional predetermined condition comprises determining if running lights 116 are not operating by detecting proper current draw to each light. Accordingly, wipers 122 on vehicle 110 comprise an existing standard mechanical accessory. However, wipers 122 are configured to be operated in a user-identifiable operating mode, preferably at a dedicated high speed that visibly notifies a driver and/or passenger of the presence of such an undesirable predetermined condition such as door 112 being open or slightly ajar. Additionally, other standard and/or optional mechanical accessories can be configured on vehicle 10 so as to notify a driver when the presence of a predetermined condition exists (and is detected). For example, audible, visual, or tactile output devices can be utilized to inform occupants of such vehicle 10 to the detected presence of a predetermined condition. One suitable visual output comprises a display.

It is understood that optional mechanical accessories can comprise dedicated accessories that are configured solely for notifying a vehicle occupant when the presence of a predetermined condition exists. For example, dedicated audible, visual, or tactile output devices can be utilized, such as dedicated speakers or audible alarms, visual displays and warning lights, or vibrating output devices that produce a tactile sensation when the user is touching an interior component of the vehicle, such as a steering wheel. It is also understood that standard mechanical accessories can comprise pre-existing circuitry and output devices already existing within a vehicle such as chime modules and chime circuitry, which are typically configured to alert a driver when a door of a vehicle has been left ajar, or where a seatbelt has not been properly latched in conjunction with the seating of an occupant in an associated seat.

Figure 3:
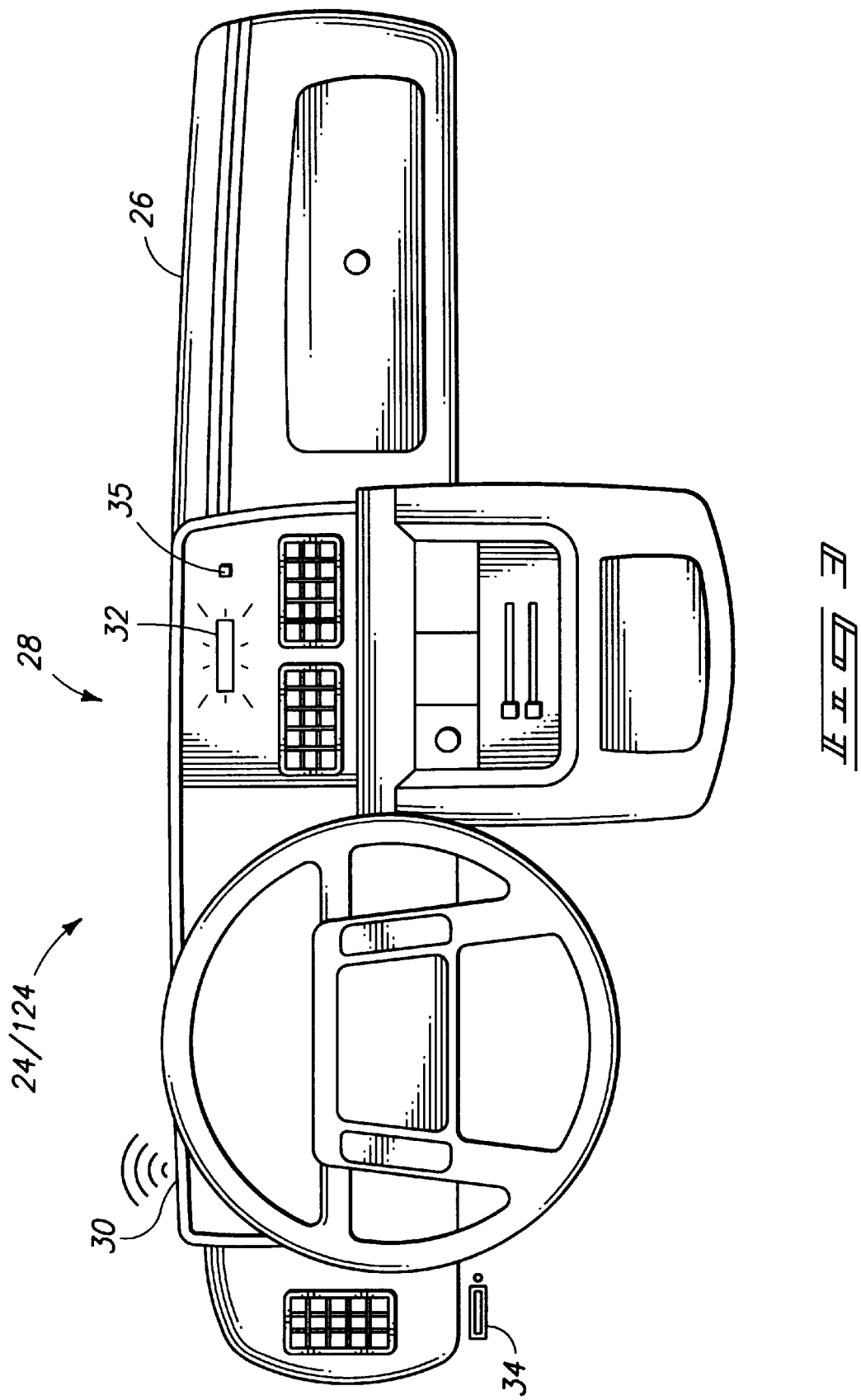
FIG. 3 is an elevational view of a vehicle instrument panel provided with a driver alert system of this invention and illustrating several operating mechanisms configured to alert an occupant of the detection of predetermined conditions.
Figure 4:
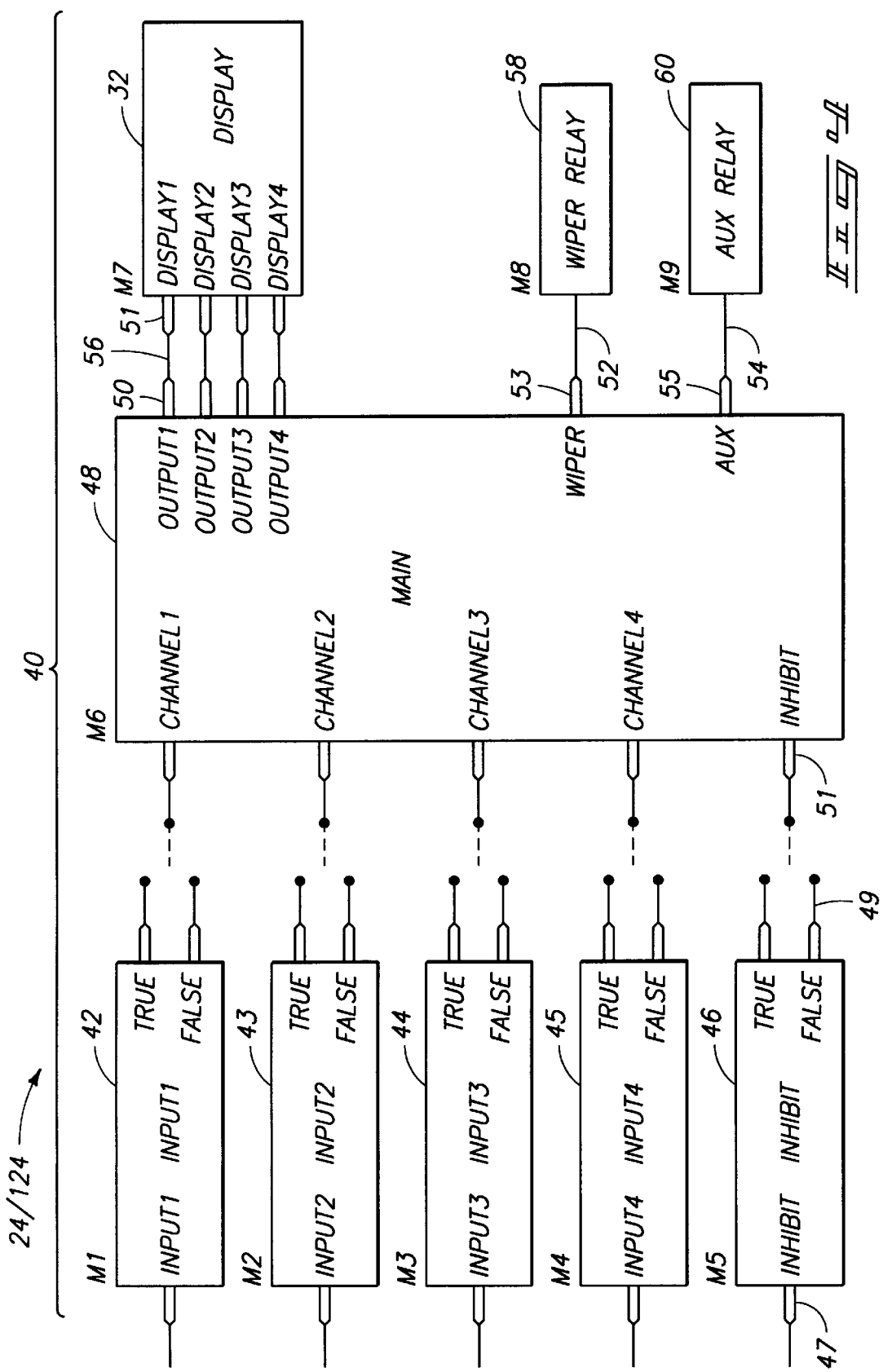
FIG. 4 is a schematic diagram of one embodiment of the invention, illustrating circuitry in the form of wiper warning circuitry containing a plurality of switches for detecting predetermined conditions and a plurality of output devices for alerting an occupant of a vehicle when such predetermined conditions exist.

FIGS. 3–5 illustrate in greater detail the construction and utilization of driver alert system 24 (of FIG. 1) and driver alert system 124 (of FIG. 2). Such constructions are implemented with substantially identical circuitry, as discussed below.

As shown in FIG. 3, driver alert systems 24 and 124 are each implemented in association with a vehicle dashboard 26, and more particularly within a vehicle instrument panel 28. Instrument panel 28 comprises a typical vehicle instrument panel usable by an operator and/or passenger for accessing vehicle controls and interfacing with vehicle performance and operation output devices. Alternatively, at least part of driver alert systems 24 and 124 can be implemented in other vehicle locations such as under the hood.

More particularly, one vehicle output device contained within instrument panel 24 comprises an audio speaker 30, such as a speaker usable with a car stereo system. Optionally, a separate, dedicated speaker can be mounted to instrument panel 28. According to one implementation, speaker 30 comprises an existing standard mechanical accessory found within instrument panel 28. Speaker 30 is utilized by driver alert system 24 in order to implement audio signaling to occupants of the vehicle and alert the occupants of the detection of a predetermined condition requiring notification thereof.

Also as shown in FIG. 3, another existing standard mechanical accessory on a vehicle comprises an output device in the form of a display 32. According to one construction, display 32 comprises an oil pressure indicator light configured to identify oil pressure within a vehicle engine. Additionally, display 32 can be selectively configured to notify and alert an occupant when other predetermined conditions are detected, such as oil level. Several such conditions include detection of vehicle conditions; for example, an unlatched or open hood and/or trunk, inadequate air pressure within vehicle tires, coolant temperature existing at an undesirable, elevated temperature, sudden loss of coolant, and the improper engagement of trailer and accessory features with a vehicle cab. For the case of emergency vehicles having sirens and emergency lights, the detection of additional predetermined conditions can be used to visibly alert a user via display 32. Different conditions can also be selectively displayed.

Accordingly, speaker 30 and display 32 comprise an audible and visible output device, respectively, each of which comprises an existing standard mechanical accessory contained within a vehicle. It is understood that more than one predetermined condition can be monitored with more than one sensor such that a predescribed sequence of predetermined conditions is utilized by driver alert system 24 or 124 to alert a driver accordingly. For example, one sensor might detect proper door closure while another sensor might detect proper operation of a siren such that a predescribed sequence requires that just one of the two conditions be met in order that a vehicle occupant is alerted to such predescribed sequence of predetermined conditions.

As shown in FIG. 3, display 32 comprises a warning indicator that in one construction is also coupled for operation with a door closure sensor 42 (see FIG. 4). Similarly, display 32 can be configured to selectively warn when a parking brake 34 has not been released. When parking brake 34 is released, the device will go into a warning mode wherein the wipers 22 are operated at a distinct, high rate of speed so as to "wag". Alternatively, an audible alarm is emitted by speaker 30, by lights 116 (of FIG. 2), or by display 32.

Also forming a portion of driver alert systems 24 and 124, an over-ride switch 35 is provided adjacent to display 32. Over-ride switch 35 enables an operator to over-ride output of an audible or visual alert indicator from the existing standard mechanical accessories, such as speaker 30 and display 32, during the detection of a predetermined condition.

It is to be understood that a predetermined condition is understood to mean any condition relating to the operation of a vehicle. Furthermore, predetermined condition is understood to also represent safety features related to performance of a vehicle such as door open conditions, low oil pressure conditions, high temperature conditions, power takeoff (PTO) engagement, pump engagement, retraction and stowage of an aerial ladder on a fire truck, etc. Hence, any physical component operating on a vehicle can be monitored in order to determine its condition. The detected presence of an undesirable predetermined condition for a component on a vehicle can be used to alert a vehicle occupant. As such, an existing standard mechanical accessory on the vehicle is used to alert an occupant of such vehicle via one of driver alert systems 24 and 124.

FIG. 4 illustrates one embodiment of the invention wherein a typical circuit layout is implemented for each of driver alert systems 24 and 124. More particularly, each driver alert system 24 and 124 comprises circuitry 40 configured in the form of a wiper warning circuit according to one implementation. Such implementation includes a plurality of sensors 42–45 and an inhibit sensor 46. Sensors 42–45, in one implementation, can comprise individual switches. Each sensor includes a physical input comprising a mechanical and/or electrical input and a pair of outputs 49. Sensor 42 comprises one sensor usable with a first input (input 1) such as a door sensor usable for detecting the open condition, or improperly closed condition, of door 12 or 112 (of FIGS. 1 and 2, respectively). Sensors 43–46 comprise separate sensors, each capable of measuring other dedicated predetermined conditions on a vehicle requiring detection and notification. Such sensors alert an operator or user of such vehicle based upon a predescribed sequence of predetermined conditions.

Circuit 40 further comprises a central integrated circuit 48 configured to receive a plurality of inputs 51. Integrated circuit 48 has logic capabilities enabling the determination of whether to alert a user based upon receipt of at least one predetermined condition via one or more of sensors 42–46. In one form, integrated circuit 48 comprises a control, including a processor. Inhibit sensor 46 is configured to detect tactile activation (depression) of over-ride switch 35 by an occupant. When activation of over-ride switch 35 is detected, switch 46 inhibits continued notification to an occupant of the detected predetermined condition(s).

Integrated circuit 48 contains logic capabilities that are selectively enabled so as to alert a user to the detected presence of a predescribed sequence of predetermined conditions that have been received from each of sensors 42–46. Furthermore, integrated circuit 48 further comprises a wiper output 53 and an auxiliary output 55. Auxiliary output 55 can be used to drive an auxiliary relay 60 and another standard mechanical accessory, and alert an occupant.

According to one construction for circuitry 40, integrated circuit 48 comprises a low-cost logic chip capable of receiving a plurality of inputs and delivering a plurality of correlated, associated outputs. Preferably, such outputs are delivered to an occupant of a vehicle via existing standard mechanical accessories such as display 32 and wipers 22 and 122 (see FIGS. 1 and 2, respectively). A wiper relay 58 is coupled in association with wipers 22 and 122, depending on the implementation of FIGS. 1 or 2, and an auxiliary relay 60 is coupled through some other existing standard mechanical accessory on the vehicle such as emergency light 14, running lights 16, siren 18, a sensor for detecting presence of equipment 20 (of FIG. 1), or lights 116 (of FIG. 2). Furthermore, such auxiliary relay 60 can be coupled to audio speaker 30 (of FIG. 3).

As shown in FIG. 4, sensors 42–46 are configured to detect the presence of such predetermined conditions in order to determine their existence. According to one implementation, sensors 42–46 each comprise a normally open switch, or contact. Alternatively, such sensors 42–46 each comprise a normally closed switch, or contact. Further alternatively, either negative or positive active signals may be selected as inputs thereto. Hence, either mechanical inputs or electrical inputs can be provided to sensors 42–46, depending on the type of switch and the predetermined condition being monitored thereby.

Additionally, each sensor 42–46 is provided with input protection from high input voltages and reversed polarity (for the case of electrical inputs).

As shown in FIG. 3, over-ride switch 35 comprises an inhibit input to integrated circuit 48 (of FIG. 4). However, it is to be understood that other inhibit inputs can be provided from any source within a vehicle such as other buttons, handles, switches or input devices.

As shown in FIG. 4, sensors 42–46 can be configured with programmable inputs such that the inputs can be programmed with jumpers during manufacture, or in the field.

Furthermore, the inhibit input of sensor 46 can be used to block out all or some of the other inputs from sensors 42–45. For the case where an input is blocked to one of sensors 42–45, display 32 will correctly display a corresponding output signal via one of outputs 50 (i.e., outputs "1–4"). When the correct display lights, the wiper relay 58 will activate operation of the wipers. However, it is to be understood that other devices for existing standard mechanical accessories can be activated, including audio, visual, tactile or other devices which enable the alerting and notification of an occupant within a vehicle. Furthermore, external devices can be utilized to notify an individual who is present outside the vehicle.

It is to be understood that an unlimited number of different inputs or outputs, and additional inhibit inputs can be utilized via sensors 42–45, and inhibit sensor 46. Such additional inputs can be programmed into integrated circuit 48 in order to block only some signals, but not other signals. Furthermore, combinations of such signals can be programmed to produce a selectively desired output in the form of a notification when a prescribed sequence of such inputs are received relating to associated predetermined conditions. In one case, a single input can be received according to a defined single predescribed sequence consisting of a single predetermined condition.

FIG. 5 illustrates a logic flow diagram for implementing a control algorithm on integrated circuit 48 (of FIG. 4). Such logic flow diagram forms a programmed algorithm comprising part of the driver alert system 24, 124 of this invention. Circuitry 40 of FIG. 4 comprises another portion of driver alert system 24, 124. More particularly, an algorithm is initiated to implement the logic flow diagram of FIG. 5 in order to detect the existence of one or more predetermined conditions and alert a driver/operator/passenger/pilot/occupant of the existence of such predetermined condition.

The logic flow diagram of FIG. 5 is initiated automatically. According to one implementation, the initiation is implemented when an engine ignition is turned on during start-up of the vehicle. According to Step "S1", an automatic start-up procedure can be used to initialize the start-up of a software-based program that implements the flow chart of FIG. 5. For example, a counter can be used to automatically initialize and reinitialize start-up of the flow chart during operation of a vehicle. Such a timer can automatically initialize, or trigger, operation of the driver alert system accordingly. Alternatively, such a system can be manually initiated by way of a switch or tactile input device when an occupant enters the vehicle. After performing Step "S1", the process proceeds to Step "S2".

In Step "S2" of FIG. 5, a condition status is detected and compared to determine whether it is required to alert the driver to presence of such a condition. Such check is implemented via a processor of the integrated circuit 40 (of FIG. 4). The processor compares a value for the condition status retrieved from a memory of integrated circuit 48 (of FIG. 4) with the detected condition status to determine whether the condition status requires the driver be alerted. If it is determined the condition status does not require alerting a driver, the process proceeds back to Step "S2". If it is determined that the condition status requires alerting a driver, the process proceeds to Step "S3".

In Step "S3", the processor checks to determine whether the inhibit input sensor 46 (of FIG. 4) has been enabled via activation of a disarming mechanism such as over-ride switch 35 (of FIG. 3). If it is determined that the disarming mechanism has been enabled, the process proceeds to Step "S1". If it is determined that the disarming mechanism has not been enabled, the process proceeds to Step "S4".

In Step "S4", the processor initiates operation of a vehicle operating mechanism (i.e., wipers) to alert a driver of such detected predetermined condition. Accordingly, for the case of the wipers, such wipers are enabled to operate at an identifiable, preferably a relatively high, speed compared to a normal wiper operating mode so as to signal to a driver that such predetermined condition has been detected. Optionally, operating speed and/or characteristics can be varied from normal operation to alert a driver. After performing Step "S4", the process proceeds to Step "S5".

In Step "S5", the processor checks to determine whether the condition has been corrected. For example, for the case where a door is detected as being ajar or open, sensor 42 (of FIG. 4) will measure such change when an operator takes remedial action to close such door properly, and integrated circuit 48 will enable the accompanying processor to determine such corrective action. If it is determined that no corrective action has been taken, the process proceeds to Step "S4". If it is determined that corrective action has been taken, the process proceeds to Step "S6".

In Step "S6", the processor disables operation of the operating mechanism (in one case, the wipers) in response to detection of a condition being corrected. After performing Step "S6", the process proceeds to Step "S7".

In Step "S7", the processor terminates the process. According to one implementation, the process begins all over at Step "S1" after a timed interval is measured by the processor. In another implementation, Step "S7" immediately proceeds back to Step "S1".

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A driver alert system, comprising: a sensor through which a predetermined condition of an undesirable state of at least one vehicle parameter on a vehicle can be detected;

a windshield wiper of a vehicle; and circuitry configured to activate the windshield wiper to alert the driver when the predetermined condition is detected;

and wherein the predetermined condition of an undesirable state of at least one vehicle parameter is a condition for which the windshield wiper is not normally used.

2. The driver alert system of claim 1 further comprising a relay coupled with the circuitry, and operable to activate the windshield wiper at an identifiable operating speed responsive to presence of the detected predetermined condition.

3. The driver alert system of claim 1 wherein the sensor has activated and inactivated states.

4. The driver alert system of claim 1 wherein the sensor comprises a normally open switch.

5. The driver alert system of claim 1 wherein the sensor comprises a normally closed switch.

6. The driver alert system of claim 1 wherein the sensor comprises a vehicle mechanical deficiency condition sensor.

7. The driver alert system of claim 6 wherein the vehicle mechanical deficiency condition sensor comprises a contact switch.

8. The driver alert system of claim 1, further comprising an operating mechanism having an alarm-indicating activated state.

9. The driver alert system of claim 8 wherein the operating mechanism comprises the windshield wiper having an identifiable alarm-indicating high-speed operating state.

10. The driver alert system of claim 8 wherein the operating mechanism comprises a visual output device operatively associated with the circuitry and configured to visually alert a driver when the predetermined condition is detected.

11. The driver alert system of claim 8 wherein the operating mechanism further comprises a speaker operatively associated with the circuitry and configured to audibly alert a driver when the predetermined condition is detected.

12. The driver alert system of claim 8 wherein the sensor comprises an oil pressure sensor and the operating mechanism further comprises an oil pressure display, the oil pressure display configured to visibly alert a driver when low oil pressure is detected.

13. The driver alert system of claim 1 further comprising a parking brake light operatively associated with the circuitry and configured to enable operation of the driver alert system when released and disable operation when engaged.

14. The driver alert system of claim 1, further comprising a disarm mechanism operatively associated with the circuitry and configured to enable the driver to disarm activation of the windshield wiper upon occurrence of the predetermined condition.

15. The driver alert system of claim 14 wherein the disarm mechanism comprises a switch.

16. The driver alert system of claim 1 wherein the sensor comprises a door-open sensor.

17. A driver alert system comprising:
   a sensor through which a predetermined condition on a vehicle can be detected;
   a windshield wiper of a vehicle; and
   circuitry configured to activate the windshield wiper when the predetermined condition is detected, and wherein the sensor comprises a plurality of sensors, with a prescribed sequence of predetermined detected conditions for the sensors operative to activate the windshield wiper.

18. A windshield wiper alarm, comprising: a sensor for measuring a predetermined condition of an undesirable state of at least one vehicle parameter on a vehicle;
   a windshield wiper of a vehicle; and
   control circuitry configured to activate the windshield wiper responsive to detection of the predetermined condition by the sensor and thereby alert a vehicle occupant;
   and wherein the predetermined condition of an undesirable state of at least one vehicle parameter is a condition for which the windshield wiper is not normally used.

19. The windshield wiper alarm of claim 18 further comprising a disarm mechanism operatively associated with the control circuitry and configured for use by a driver to disarm activation of the windshield wiper during the detected occurrence of the predetermined condition.

20. The windshield wiper alarm of claim 18 wherein the circuitry comprises an integrated circuit having a processor.

21. A method for alerting a driver to a predetermined condition, comprising:
   placing a sensor on a vehicle, the sensor outputting a sensor signal as a function of a predetermined condition of an undesirable state of at least one vehicle parameter on the vehicle;
   detecting the sensor signal;
   determining the existence of the predetermined condition based upon the detected sensor signal; and
   starting a windshield wiper at an identifiable operating speed to alert a vehicle occupant when the predetermined condition is detected;
   and wherein the predetermined condition of an undesirable state of at least one vehicle parameter is a condition for which the windshield wiper is not normally used.

22. The method of claim 21 wherein the predetermined condition sensor comprises a contact switch.

23. The method of claim 22 wherein the contact switch comprises a normally open switch.

24. The method of claim 22 wherein the contact switch comprises a normally closed switch.

25. The method of claim 21 wherein the predetermined condition to be sensed comprises a vehicle mechanical deficiency condition.

26. The method of claim 21 wherein the predetermined condition to be sensed comprises an open door deficiency condition.

27. The method of claim 21 wherein the predetermined condition to be sensed comprises a low oil pressure deficiency condition.

28. The method of claim 21, further comprising the step of generating an audible signal indicating that the status of the predetermined condition requires alerting a driver.

29. The method of claim 21, further comprising the step of generating a visual alarm indicating that the status of the predetermined condition requires alerting a driver.

* * * * *